July 2, 1968 J. J. BRADLEY Re. 26,418

CUTTING DEVICE

Original Filed July 9, 1963 2 Sheets-Sheet 1

CUTTING DEVICE

Original Filed July 9, 1963 2 Sheets-Sheet 2

United States Patent Office

Re. 26,418
Reissued July 2, 1968

26,418
CUTTING DEVICE

John J. Bradley, Green Bay, Wis., assignor to Paper Converting Machine Co., Inc., Green Bay, Wis., a corporation of Wisconsin Original No. 3,190,163, dated June 22, 1965, Ser. No. 293,761, July 9, 1963, which is a continuation-in-part of Ser. No. 81,009, Jan. 6, 1961. Application for reissue Dec. 29, 1967, Ser. No. 698,071
2 Claims. (Cl. 83—342)

Matter enclosed in heavy brackets [ ] appears in the original patent but forms no part of this reissue specification; matter printed in italics indicates the additions made by reissue.

This invention is a continuation-in-part of copending application No. 81,009, now abandoned and relates to a cutting device, and, more particularly, to a cutting device to progressively shear a traveling web.

The invention has to do generally with the art of transversely severing webs traveling at a high speed—as would be the case in the rewinding of toilet tissue, toweling, etc. In this field, the paper is produced at high speed on paper machines and wound into a sizable "parent" roll which may be as big as six feet in diameter and upwards of eight feet in length. To provide this material in a marketable form for retail stores, it must be unwound and thereafter rewound into the conventional small rolls. Relative to toilet tissue, for example, the small rolls have a length of four and one-half inches in the United States and are transversely perforated each four and one-half inches. Heretofore, the perforating operation has been a distinct limitation upon the speed attainable during the rewinding operation, and the provision of novel apparatus for overcoming this limitation constitutes an important objective of this invention.

Another object of this invention is to provide a unique blade element for use in a shear cutting device such as a shear cut perforator employed in conjunction with the processing of continuous webs.

Other objects and advantages of the invention may be seen in the details of construction and operation as set down in this specification.

The invention will be explained in conjunction with an illustrative embodiment in the accompanying drawing, in which.

Figure 1:
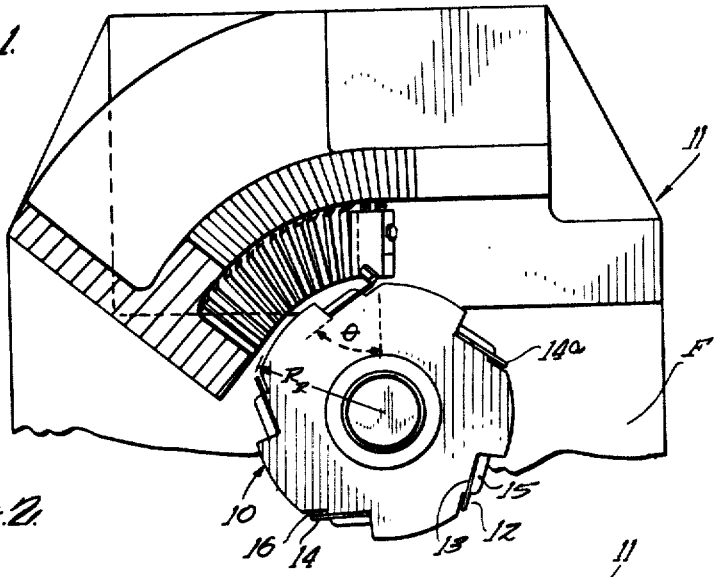
FIG. 1 is an elevational view, partially in section, of a portion of a rewinder machine which features the inventive construction and which is specifically adapted tc transversely perforate a web traveling at high speed.
Figure 2:
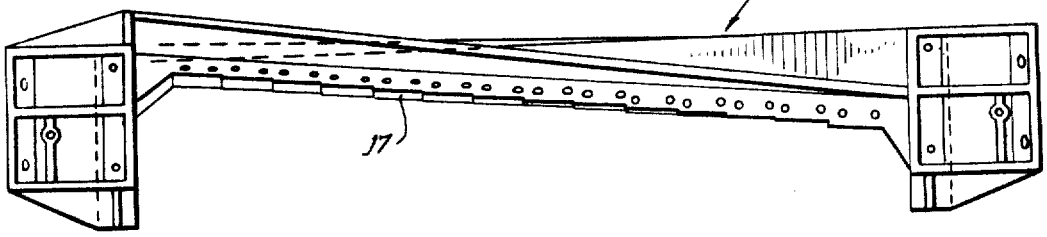
FIG. 2 is a top plan view of the upper element of FIG. 1 and which essentially includes means for supporting anvil blades.
Figure 3:
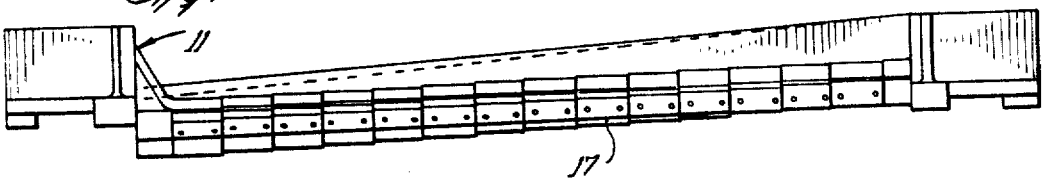
FIG. 3 is a side elevational view of the structure seen in FIG. 2.

In the illustration given, and with particular reference to FIG. 1, the numeral 10 designates generally a blade roll or bedroll, and the numeral 11 designates generally an anvil-supporting member. It will be appreciated that these members are, in general, conventional and well known, and are provided as part of a rewinder machine. In the interest of brevity and ease of understanding, the well-known frame details have been omitted from the drawing herein, but it may be appreciated that the roll 10 is suitably journaled in a frame F for rotation when in partial wrapping engagement with a web traveling with it, the frame F also supporting the member 11. The blade-equipped bedroll is suitably driven by gears, or the like, as at 10a.

The bedroll 10 is equipped with a plurality of longitudinally-extending, circumferentially spaced-apart recesses 12. Each recess provides an elongated bearing surface 13 which rigidly supports a flexible blade 14 remote from the cutting edge 14a. The blade is held against the surface 13 by means of a clamping block 15, and is positioned and sized so as to protrude slightly from the periphery or circumference of the roll 10. The recess 12 is equipped with an additional recessed portion 16, which operates to relieve the blade for flexing when the same enters into engagement with an anvil blade 17 rigidly supported in a generally immovable fashion on the holder.

Figure 4:
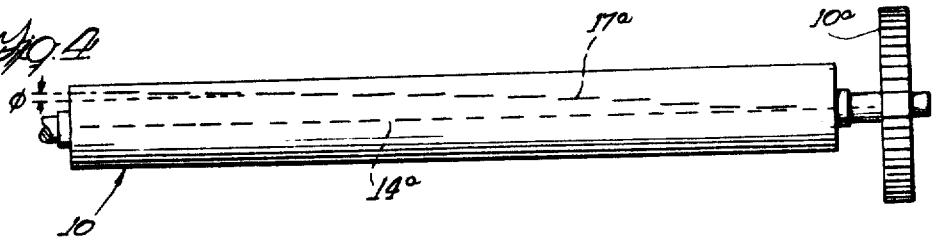
FIG. 4 is a fragmentary elevational view of the roll constituting the lower portion of the apparatus of FIG. 1 and which is essentially diagrammatic, showing the roll blade cutting edges in relation with the anvil blade cutting edge.

As can be appreciated from a consideration of FIG. 4, the roll blades 14 are arranged with their cutting edges 14A parallel with the axis of the roll 10, while the developed position of the cutting edges 17A of the anvil blades 17 approximates a spiral. The angle between the anvil blade cutting edge and the center line of the bedroll is called the anvil blade helix angle $\phi$ in FIG. 4. The blade arrangement brings about a progressive point contact between the roll blades and the anvil blades, the interference between the blades being adjusted to the order of about 0.004", depending upon the type of web to be cut and the sharpness of the blade cutting edges. Thus, each roll blade 14 is engaging its mating anvil blade 17 at only one point at a given instant, and this point contact progresses along the length of the two mating blades. Here, it will be appreciated that the anvil blade is of substantial rigidity as contrasted to the roll blade 14, a typical anvil blade having a thickness of the order of ⅛" and being solidly mounted, while the roll blade has a thickness of the order of 1/32" and is mounted so the cutting edge is flexible.

Relative to the arrangement of the anvil blades 17, the same may be set down in the form shown wherein they may approximate a single spiral or helix, whereby at any one time only one anvil blade is engaged by one roll blade. Alternatively, the anvil blades may be stepped so that two or more anvil blades are simultaneously engaged by their corresponding roll blades. However, it will be appreciated that relative to each anvil blade, there is only a point contact or engagement with its corresponding roll blade at any given instant.

Preferably, but not necessarily, the roll blades are notched or equipped with cut-outs as at 18 (see FIG. 5) to provide bonds in the web being transversely severed. These notches or bond cut-outs may be in the anvil blades, leaving the roll blades unnotched. These cut-outs then result in the well-known perforations seen in toilet tissue, toweling, etc.

Figure 5:
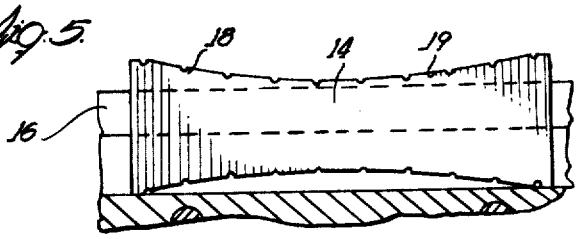
FIG. 5 is an enlarged fragmentary view, partially in section, of the blades associated with the roll or rotating member seen in FIGS. 1 and 4.
Figure 7:
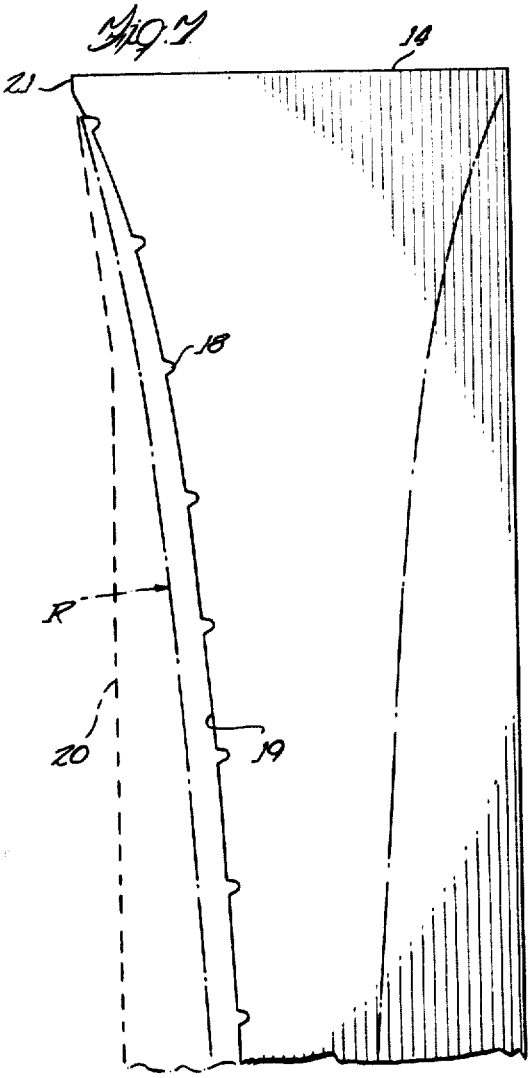
FIG. 7 is a fragmentary elevational view of one of the blades of FIG. 5 and which shows, in various construction lines, the theory of operation of the developed blade.
Figure 8:
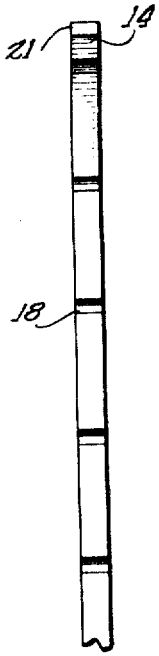
FIG. 8 is a side elevational view of the blade seen in FIG. 7.
Figure 9:
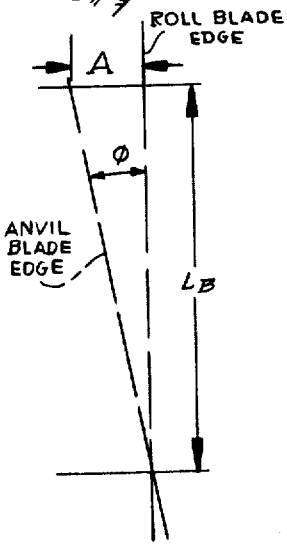
FIG. 9 is a schematic view of the blade cutting edges having designated thereon some of the variables employed in the teaching of the invention.
Figure 6:
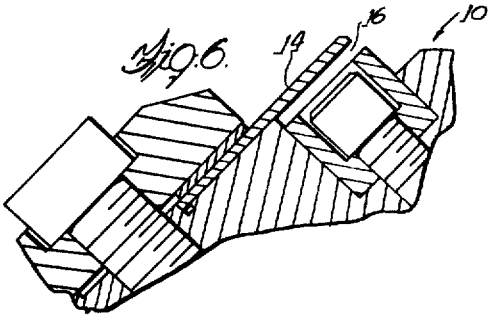
FIG. 6 is a fragmentary sectional view of the structure seen in FIG. 5.

The inventive blade is seen in larger scale in FIGS. 5–7 and is characterized by a central depression or recessed portion as at 19. This is conveniently obtained by hollow grinding one or both of the thinner, longitudinally-extending faces of the blade.

Conventionally, both roll blades and anvil blades have straight cutting edges. Due to this fact, the anvil blade cutting edge does not form a segment of a true helix but actually is a chord of a true helix. Accordingly, when the flexible roll blade passes in contact with the anvil blade, there is least interference between the blades at the points where the chord of the anvil blade touches the true helix at the ends of the blade, and there is a larger interference between the blades at the point where the chord of the anvil blade deviates most from a true helix, i.e., at the center of the blades. It has been determined that due to this factor and the fact that the roll blades are more flexible at their ends than in the center, the contact force at the center of the blades is more than twice the contact force at the ends of the blades when the blades have been properly set to cut throughout their entire length of contact. Since the anvil blades are set to cut along their entire length, the contact force at the end of the blade is all that is needed to cut the web. Thus the centers of the blades are exposed to unnecessarily severe contact forces which serve only to increase wear of both roll blades and anvil blades and subject the roll blades to severe bending and vibration stresses.

It has been found that the hollow ground shape of the roll blade is effective in maintaining nearly constant contact force between the roll blade 14 and the corresponding anvil blade 17 at all points of mutual contact, the blades 14 and 17 being aligned, as can be appreciated from FIG. 4. Equally effective results of constant contact force between the blades 14 and 17 can be realized by hollow-grinding the anvil blade similarly, but on a different contour. Still further, the benefits of the invention can be realized by complementarily hollow-grinding both of the matable anvil and roll blades.

To achieve the optimum contour, two factors must be considered in the hollow grinding. One factor involves compensating for the fact that the straight cutting edge of the anvil blade is not a true helix, but only an approximation of a true helix. With a straight blade, this causes greater blade deflection, and consequently greater contact force, in the center of the blade than at the ends of the blade.

The second factor involves compensating for the fact that it takes less force to produce a given deflection of the end of the blade than it takes to produce the same deflection at the center of the blade. For instance, since the blade is stiffer at the center than at the ends, the amount of deflection which is produced by interference between blade and anvil must be less in the center of the blade than at the ends of the blade if the contact force at both points is to be the same.

In addition, there are several variables which must be considered in determining the exact depth and profile of the hollow grind to achieve the desired results. These are: (1) the anvil blade helix angle $\phi$ at which the anvils are set—the greater the helix angle, the deeper the hollow grind needed; (2) the blade mounting angle $\theta$; (3) the distance the blade protrudes from the clamp in the bedroll; (4) the radius from the centerline of the bedroll to the cutting edge of the roll blade; and (5) the blade and anvil contact force required to cut the web satisfactorily—this being dependent upon anvil helix angle and the paper web, or the like, being perforated.

The variable of the anvil blade helix angle $\phi$ is especially significant in high speed operation, i.e., when the perforator is operated at speeds in excess of 2000 feet per minute. It was found that blade failure occurred immediately at high speeds because of the high rate of load propagation along the cutting edge of the roll blade—as contrasted to bending of the roll blade where it is clamped within the bedroll recess. By making the anvil helix angle greater, the rate of load propagation along the roll blade can be reduced, i.e., the greater the angle by which the line of the anvil cutting edge deviates from parallel with the axis of the bedroll, the lower the speed of load movement along the roll blade cutting edge. As an illustration, in previous designs, the helix angle was 0.2" per 4½" length. The 4½" length is selected since, as indicated previously, this is the width of a toilet tissue web and provides an optimum blade length. With this helix angle of 0.2" per 4½" length, the perforating machine could be satisfactorily run up to 1500–1800 feet per minute—the top speed being somewhat dependent upon the cutting force required. When the helix angle was increased in an effort to increase the operating speed, the greater departure of the anvil blade contour from a true helix resulted in excessive roll blade wear and premature roll blade breakage, but the greater anvil helix angle did eliminate the previously experienced immediate breakage of roll blades at higher speeds.

To compensate for the departure of the anvil cutting edge from being a segment of a true helix, the roll blade 14 is hollow ground on a radius R which is determined by the following formula:

$$R=\frac{L_B^2+4\left[\frac{R_R-1/2\sqrt{4R_R^2-A^2}}{\cos\theta}\right]^2}{8\left[\frac{R_R-1/2\sqrt{4R_R^2-A^2}}{\cos\theta}\right]}$$

R=radius of hollow-grind to compensate for anvil edge not being a segment of a true helix $L_B$=length of blade cutting edge contacting a single anvil $R_R$=radius from the centerline of the bedroll to the cutting edge of the roll blade A=offset of anvil cutting edge to form anvil helix angle $\theta$=the angle between (a) a line on the widest surface of the blade perpendicular to and passing through the cutting edge and (b) a line passing through the centerline of the bedroll and cutting edge of the blade—i.e., the blade-mounting angle $\theta$ of FIG. 1. This may be chosen for optimum performance as 45°.

The composite grind at 19 is achieved by a combination of the hollow grind on the radius R coupled with a shallower grind to compensate for the extra flexibility of the blade ends, as is designated in FIG. 7 by the numeral 20. Thus, the extra flexibility of the blade ends is compensated for by having the ends protrude further from the bedroll and interfere more with the anvil than the center span so as to result in an equal cutting force along the entire roll blade cutting edge. The roll blade 14 may be equipped with flat surfaces 21 at the ends thereof for ease of manufacturing and mounting. However, the recessed portion extends substantially the entire length of the blade on a gradual curvature having its apex at the center of the blade length.

As seen in FIG. 7, the blade may be ground along one side, or both as in FIG. 5, depending on whether the blade is to be reversed to provide four cutting edges. If merely one cutting edge is required, the hollow ground contour may be somewhat beveled, as seen in FIG. 6.

The blades 14 advantageously can be constructed of high speed tool steel. The maximum deviation from the straight cutting edge occurs at the longitudinal center of the blade and for a 4½" long, 1/32" thick blade having a width ⅞" at the ends—and amounts to 0.0075" for a helix angle of 0.400" per 4½" length and 27" circumference bedroll. In other words, the width of the blade at the center is 0.735". For a steeper helix angle, a greater depth of hollow grind is employed according to the previously given equation. The notches 18 are about 1/16", i.e. of the order of 1½ to 2 blade thickness. Normally, twenty-nine notches 18 are employed for each blade 14.

While, in the foregoing specification, I have set forth a detailed description of an embodiment of the invention for the purpose of illustration thereof, many variations in the details herein given will be perceived by those skilled in the art without departing from the spirit and scope of the invention.

I claim:

[1. A flexible blade adapted to contact with an angularly-disposed anvil blade in perforating a web traveling with said flexible blade, comprising a body (A) having the general shape of an elongated rectangular solid and defining thereby two oppositely-disposed narrow elongated faces and two oppositely-disposed wide elongated planar faces, (B) at least one of the narrow faces having a concave contour to provide an elongated, longitudinally tapered recessed portion extending substantially along the length of said one face and having the tapered recess apex centrally of the length of said one face, (C) said one face being equipped with longitudinally spaced-apart notches, (i) said notches having generally parallel sides to receive portions of said web and thereby provide bonds in said traveling web during perforation thereof, adjacent notches being spaced apart by a distance greater than the width of the notches.]

2. A flexible blade adapted to coact with an angularly-disposed anvil blade in perforating a web traveling with said flexible blade, comprising a body (A) having the general shape of an elongated rectangular solid and defining thereby two oppositely-disposed narrow elongated faces and two oppositely-disposed wide elongated planar faces, (B) at least one of the narrow faces having a concave contour to provide an elongated, longitudinally tapered recessed portion extending substantially along the length of said one face and having the tapered recess apex centrally of the length of said one face, (i) said concave contour having a greater radius of curvature adjacent the ends of the body to compensate for the greater flexibility of the blade ends relative to the blade center, (C) said one face being equipped with longitudinally spaced-apart notches, (i) said notches having generally parallel sides to receive portions of said web and thereby provide bonds in said traveling web during perforation thereof, adjacent notches being spaced apart by a distance greater than the width of the notches.

[3. A knife blade for a shear cut perforator, comprising a generally rectangular solid body having (A) four longitudinally-extending cutting edges, (i) each of said edges having a concave contour extending over most of its length, (B) said body being equipped with transverse notches interrupting said concave contour, adjacent notches being spaced apart by a distance greater than the width of the notches.]

[4. In a web perforating apparatus, (A) a frame, (B) a cutting roll mounted for rotation in said frame, (i) means for rotating said roll, (ii) said roll having a plurality of circumferentially spaced recesses therein and a rigid bearing surface within each recess, (C) a flat resilient blade rigidly supported upon the bearing surface in each recess and (i) having an inclined, outwardly-extending free portion provided with a cutting edge, (ii) said roll being provided with a further recess about each outwardly-extending free blade portion for relieving the same for flexing, (iii) the inclination of each blade being such that it forms, with a radial line drawn from its cutting edge to the roll center, an acute angle, (D) a blade-supporting member adjacent said roll adapted to support a blade for contact with the blades of said cutting roll, (E) a flat anvil blade supported on said member and (i) having its cutting edge radially inward of the path of travel of the cutting edges of the roll blades, (ii) said anvil blade being arranged with its cutting edge at an angle to the cutting edge of each roll blade to provide progressive point contact as the edges of said blade are brought into engagement during rotation of said roll in the perforating operation, with the said resilient blade edge yielding during said engagement, (I) each of said roll blades being equipped with a concave contour extending generally over the length of the cutting edges of the roll blades whereby said anvil blade and roll blade develop a uniform cutting force during progressive point contact therebetween, (II) each roll blade being equipped with a plurality of longitudinally-spaced-apart, transversely extending notches in its cutting edge.]

[5. In web perforating apparatus, (A) a frame, (B) a cutting roll mounted for rotation in said frame, (i) means for rotating said roll, (ii) said roll having a plurality of circumferentially spaced recesses therein and a rigid bearing surface within each recess, (C) a flat resilient blade rigidly supported upon the bearing surface in each recess and (i) having an inclined, outwardly-extending free portion provided with a cutting edge, (ii) said roll being provided with a further recess about each outwardly-extending free blade portion for relieving the same for flexing, (iii) the inclination of each blade being such that that it forms, with a radial line drawn from its cutting edge to the roll center, an acute angle, (iv) said anvil blade having a chordal helical configuration relative to each of said roll blades, (D) a blade-supporting member adjacent said roll adapted to support a blade for contact with the blades of said cutting roll, (E) a flat anvil blade supported on said member and (i) having the cutting edge radially inward of the path of travel of the cutting edges of the roll blades, (ii) said anvil blade being arranged with its cutting edge at an angle to the cutting edge of each roll blade to provide progressive point contact as the edges of said blade are brought into engagement during rotation of said roll in the perforating operation, with the said resilient blade edge yielding during said engagement, (I) each of said roll blades being equipped with a concave contour extending generally over the length of the cutting edges of the roll blades whereby said anvil blade and roll blade develop a uniform cutting force during progressive point contact therebetween, (II) each roll blade being equipped with a plurality of longitudinally spaced-apart, transversely-extending notches in its cutting edge, (III) said chordal helical configuration being developed by an axial offset of the anvil blades of the order of 0.4" per 4½" of blade length.]

[6. In web perforating apparatus, (A) a frame, (B) a cutting roll mounted for rotation in said frame, (i) means for rotating said roll, (ii) said roll having a plurality of circumferentially spaced recesses therein and a rigid bearing surface within each recess, (C) a plurality of flat resilient blades rigidly supported upon the bearing surface in each recess in longitudinal alignment, each resilient blade (i) having an inclined outwardly-extending free portion provided with a cutting edge, (ii) said roll being provided with a further recess about each outwardly-extending free blade portion for relieving the same for flexing, (iii) the inclination of each blade being such that it forms, with a radial line drawn from its cutting edge to the roll center, an acute angle, (D) a blade-supporting member adjacent said roll adapted to support a plurality of blades for contact with the blades of said rotating roll, (E) a plurality of flat anvil blades supported on said member with each anvil blade arranged in a chordal helical relation with the roll blade it contacts, each of said anvil blades (i) having its cutting edge radially inward of the path of travel of the cutting edges of the roll blades, (ii) each of said anvil blades being arranged with its cutting edge at an angle to the cutting edge of the blade it contacts to provide progressive point contact as the edges of said blades are brought into engagement during rotation of said roll in the cutting operation, with the said resilient blade edges yielding during said engagement, (I) each of said roll blades being equipped with a concave contour extending generally over the length of the cutting edges of the roll blades whereby said anvil blade and roll blade develop a uniform cutting force during progressive point contact therebetween, (II) each roll blade being equipped with a plurality of longitudinally spaced-apart, transversely-extending notches in its cutting edge, (III) said concave contour being characterized by a radius which is a function of the amount of helix-providing offset between a given roll blade and its associated anvil blade, the length of the roll blade cutting edge contacting its associated anvil blade, and the radius from the axis of said cutting roll to the roll blade cutting edge.]

7. In web perforating apparatus, (A) a frame, (B) a cutting roll mounted for rotation in said frame, (i) means for rotating said roll, (ii) said roll having a plurality of circumferentially spaced recesses therein and a rigid bearing surface within each recess, (C) a plurality of flat resilient blades rigidly supported upon the bearing surface in each recess in longitudinal alignment, each resilient blade (i) having an inclined outwardly-extending free portion provided with a cutting edge, (ii) said roll being provided with a further recess about each outwardly-extending free blade portion for relieving the same for flexing, (iii) the inclination of each blade being such that it forms, with a radial line drawn from its cutting edge to the roll center, an acute angle, (D) a blade-supporting member adjacent said roll adapted to support a plurality of blades for contact with the blades of said rotating roll, (E) a plurality of flat anvil blades supported on said member with each anvil blade arranged in a chordal helical relation with the roll blade it contacts, each of said anvil blades (i) having its cutting edge radially inward of the path of travel of the cutting edges of the roll blades, (ii) each of said anvil blades being arranged with its cutting edge at an angle to the cutting edge of the blade it contacts to provide progressive point contact as the edges of said blades are brought into engagement during rotation of said roll in the cutting operation, with the said resilient blade edges yielding during said engagement, (I) each of said roll blades being equipped with a concave contour extending generally over the length of the cutting edges of the roll blades whereby said anvil blade and roll blade develop a uniform cutting force during progressive point contact therebetween, (II) each roll blade being equipped with a plurality of longitudinally spaced-apart, transversely-extending notches in its cutting edge, (III) said concave contour having a greater radius of curvature adjacent the ends of the blade whereby said roll blades are operative to compensate for both the departure of the flat anvil blades from a true helix and for the relatively greater flexibility of the roll blade ends as compared to the center thereof.

[8. In web perforating apparatus, (A) a frame, (B) a cutting roll mounted in said frame, (i) means for rotating said roll, (ii) said roll having a longitudinally-extending recess in the outer wall thereof with a rigid bearing surface within said recess, (C) a flat straight resilient cutting blade rigidly supported upon said bearing surface and (i) having an inclined, outwardly-extending free edge portion to serve as a cutting edge, (ii) said roll being provided with a further recess about the outwardly-extending free blade portion for relieving the same for flexing, said blade being inclined with respect to a radial line drawn from its cutting edge to the roll center to form with said line an acute angle, (D) a blade-supporting member adjacent said roll adapted to support an anvil blade for contact with said resilient blade, (E) a flat straight anvil blade rigidly supported on said member and (i) having its cutting edge radially inward of the path of travel of the cutting edge of the roll blade, (ii) said anvil blade being arranged with its cutting edge at an angle to the cutting edge of said roll blade to provide progressive point contact as the edges of the blades are brought into engagement during rotation of said roll in the perforating operation with the resilient blade edge yielding during said engagement, (iii) said anvil blade having a chordal helical configuration relative to said roll blade, at least one of said roll and anvil blades being (I) equipped with a concave contour extending generally over the length of its cutting edge, and at least one of said roll and anvil blades being (II) equipped with a plurality of longitudinally spaced-apart, transversely-extending notches in its cutting edge.]

[9. In web perforating apparatus, (A) a frame, (B) a cutting roll mounted in said frame, (i) means for rotating said roll, (ii) said roll having a longitudinally-extending recess in the outer wall thereof with a rigid bearing surface within said recess, (C) a flat straight resilient cutting blade rigidly supported upon said bearing surface and (i) having an inclined, outwardly-extending free edge portion to serve as a cutting edge.

(ii) said roll being provided with a further recess about the outwardly-extending free blade portion for relieving the same for flexing, said blade being inclined with respect to a radial line drawn from its cutting edge to the roll center to form with said line an acute angle, (D) a blade-supporting member adjacent said roll adapted to support an anvil blade for contact with said resilient blade, (E) a flat straight anvil blade rigidly supported on said member and (i) having its cutting edge radially inward of the path of travel of the cutting edge of the roll blade, (ii) said anvil blade being arranged with its cutting edge at an angle to the cutting edge of said roll blade to provide progressive point contact as the edges of the blades are brought into engagement during rotation of said roll in the perforating operation, with the resilient blade edge yielding during said engagement, (iii) said anvil blade having a chordal helical configuration relative to said roll blade, at least one of said roll and anvil blades being (I) equipped with a concave contour extending generally over the length of its cutting edge and (II) equipped with a plurality of longitudinally spaced-apart, transversely-extending notches in its cutting edge, (III) said concave contour being characterized by a radius which is a function of the following factors:

(a) the amount of helix-providing offset between the roll blade and anvil blade, (b) the length of the roll blade cutting edge contacting the anvil blade, and (c) the radius from the axis of said roll to the roll blade cutting edge.]

[10. In web perforating apparatus, (A) a frame, (B) a cutting roll mounted in said frame, (i) means for rotating said roll, (ii) said roll having a longitudinally-extending recess in the outer wall thereof with a rigid bearing surface within said recess, (C) a flat straight resilient cutting blade rigidly supported upon said bearing surface and (i) having an inclined, outwardly-extending free edge portion to serve as a cutting edge, (ii) said roll being provided with a further recess about the outwardly-extending free blade portion for relieving the same for flexing, said blade being inclined with respect to a radial line drawn from its cutting edge to the roll center to form with said line an acute angle, (D) a blade-supporting member adjacent said roll adapted to support an anvil blade for contact with said resilient blade, (E) a flat straight anvil blade rigidly supported on said member and (i) having its cutting edge radially inward of the path of travel of the cutting edge of the roll blade, (ii) said anvil blade being arranged with its cutting edge at an angle to the cutting edge of said roll blade to provide progressive point contact as the edges of the blades are brought into engagement during rotation of said roll in the perforating operation, with the resilient blade edge yielding during said engagement, (iii) said anvil blade having a chordal helical configuration relative to said roll blade, at least one of said roll and anvil blades being (I) equipped with a concave contour extending generally over the length of its cutting edge and (II) equipped with a plurality of longitudinally spaced-apart, transversely-extending notches in its cutting edge, (III) said concave contour being operative to compensate for both the departure of said flat anvil blade from a true helix and for the relatively greater flexibility of the roll blade ends as compared to the center thereof.]

References Cited

The following references, cited by the Examiner, are of record in the patented file of this patent or the original patent.

UNITED STATES PATENTS

| | | | |
|---|---|---|---|
| 1,977,647 | 10/1934 | Royal | 83—349 |
| 2,870,840 | 1/1959 | Kwitek | 83—342 |
| 3,056,323 | 10/1962 | Kwitek | 83—342 |
| 3,073,196 | 1/1963 | Marcalus | 83—341 |

ANDREW R. JUHASZ, *Primary Examiner.*